(12) United States Patent
Yamashita et al.

(10) Patent No.: US 6,973,237 B2
(45) Date of Patent: Dec. 6, 2005

(54) METHOD OF PRODUCING OPTICAL FIBER GRATING AND PRODUCTION DEVICE THEREFOR

(75) Inventors: Shinji Yamashita, Tokyo (JP); Yusuke Nasu, Tokyo (JP)

(73) Assignee: Japen Science and Technology Agency, Tokyo (JP)

( * ) Notice: Subject to any disclaimer, the term of this patent is extended or adjusted under 35 U.S.C. 154(b) by 86 days.

(21) Appl. No.: 10/482,590

(22) PCT Filed: May 29, 2002

(86) PCT No.: PCT/JP02/05210

§ 371 (c)(1),
(2), (4) Date: Jan. 28, 2004

(87) PCT Pub. No.: WO03/003084

PCT Pub. Date: Jan. 9, 2003

(65) Prior Publication Data

US 2004/0218859 A1    Nov. 4, 2004

(30) Foreign Application Priority Data

Jun. 27, 2001    (JP) .............................. 2001-194462

(51) Int. Cl.⁷ .............................................. G02B 6/34
(52) U.S. Cl. ...................................................... 385/37
(58) Field of Search .............................. 385/10, 15, 31, 385/37

(56) References Cited

U.S. PATENT DOCUMENTS 5,367,588 A * 11/1994 Hill et al. ..................... 385/37

(Continued)

FOREIGN PATENT DOCUMENTS

JP    2000-275442    6/2000

(Continued)

OTHER PUBLICATIONS

Electronics Letters; Jul. 18, 1996; vol. 32 pp. 1394-1396.

(Continued)

*Primary Examiner*—Brian Healy
*Assistant Examiner*—Jerry Martin Blevins
(74) *Attorney, Agent, or Firm*—Lackenbach Siegel, LLP

(57) ABSTRACT

A super structure fiber Bragg grating is produced without being limited by a phase mask length. First, a beam is allowed to scan with the relative position between a mask and an optical fiber fixed (step 1). Subsequently, the relative position between the mask and the optical fiber is moved in the lengthwise direction of the optical fiber (step 2). Besides, the beam is allowed to scan with the relative position between the mask and the optical fiber fixed as at the step 1. Next, in order to correct and match a phase deviation, the mask is removed, and a uniform ultraviolet beam is applied to the optical fiber, whereby a refractive index can be uniformly changed, and the optical length of the corresponding portion is changed to impart a phase shift (step 3). The phase shift-imparting position may be the place between both the fixed positions or any other suitable place. A phase shift amount is determined by an ultraviolet beam irradiation time (or light pulse number), and if a necessary phase shift amount has been attained is determined while a reflection spectrum is being observed. The SSFBG of free length can be fabricated by repeating the above steps.

9 Claims, 15 Drawing Sheets

U.S. PATENT DOCUMENTS

| | | | | |
|---|---|---|---|---|
| 5,837,169 A | | 11/1998 | Rourke | 264/1.27 |
| 5,912,999 A | * | 6/1999 | Brennan et al. | 385/37 |
| 6,072,926 A | * | 6/2000 | Cole et al. | 385/37 |
| 6,370,301 B1 | * | 4/2002 | Kokura | 385/37 |
| 6,483,965 B1 | * | 11/2002 | Napier et al. | 385/37 |
| 6,751,380 B1 | * | 6/2004 | Imamura et al. | 385/37 |
| 2001/0043774 A1 | * | 11/2001 | Tormen | 385/37 |

FOREIGN PATENT DOCUMENTS

| | | |
|---|---|---|
| WO | WO 95/22068 | 8/1995 |
| WO | WO 96/24079 | 8/1996 |
| WO | WO98/08120 | 2/1998 |

OTHER PUBLICATIONS

JST Copyright 99A0976933 Sampled Fiber Grating Based Dispersion Slope Compensator-LOH, Zhou, Pan, IEEE Photonic Technol Letter vol. 11, No. 18, Oct. 1999, pp. 1280-1283.

JST Copyright 96A0982569 Minimization of Phase Errors in Long Fiber Bragg Grating Phase Masks Made Using Electron Beam Lithography. Theriault-Bilodeau; Johnson, Hill IEEE Photonic Technol Letters vol. 8 No. 10, Oct. 1996 pp. 1334-1336.

* cited by examiner (a)

(b)

METHOD OF PRODUCING OPTICAL FIBER GRATING AND PRODUCTION DEVICE THEREFOR

TECHNICAL FIELD

The present invention relates to a method of producing an optical fiber grating and a production device therefor, and more particularly to a method of producing a super structure fiber Bragg grating and a production device therefor.

BACKGROUND OF THE INVENTION

Since the room-temperature oscillations of semiconductor lasers became possible contemporaneously with the advent of low-loss optical fibers in the 1970's, various researches utilizing light have been actively made in the world. Especially the field of optical communications has progressed rapidly owing to the advent of optical amplifiers (EDFAs), and it is presently possible to realize transmission systems for ultralong-distance transmission (up to 10,000 km), ultra-high-speed transmission (up to 40 Gb/s), wavelength division multiplexing transmission (WDM, up to 256 wavelengths), etc. Therefore, an optical-fiber information communication network is considered to be the most important infrastructure in the early part of the twenty-first century. At present, however, an optical-fiber communication system is used only for a trunk route loop chiefly having termination units in one-to-one correspondence, and a network part is principally constructed of conventional coaxial cables and semiconductor integrated circuits/electron devices. Owing to the tremendous progress of the Internet in recent years, the growth of a transmission capacity required of a network in the future is predicted to be double in 12 months. This situation exceeds so-called "Moore's law" (double in 18 months) concerning semiconductor integrated circuits. It may safely be said that a WDM optical network utilizing light, for example, will be necessitated also for the network part in due course. At present, however, optical devices for the WDM optical network are still immature, and it is an urgent necessity to develop the optical devices.

SUMMARY OF THE INVENTION

In such WDM technology, an optical filter, for example, becomes an indispensable device. As the optical filter for WDM optical communications, notice is taken of a super structure fiber Bragg grating (Super Structure FBG) which is one kind of optical fiber Bragg grating (FBG). Here, the "FBG (short for "Fiber Bragg Grating" indicating an optical-fiber diffraction grating)" is a device in which the core portion of an optical fiber is endowed with an index change having a period of wavelength order (up to 1 micron), and which exhibits a sharp wavelength-selective reflection characteristic. The index change is nondestructively attained by irradiating the optical fiber with an ultraviolet beam from outside this optical fiber. Besides, the structure of the wavelength-order period is attained by interference fringes formed by a phase mask, when the phase mask or the like is interposed in the irradiation with the ultraviolet beam. Since the FBG can be designed flexibly as compared with any other optical filter, an optical filter having functions not available before can be fabricated by contriving the diffraction grating. Since the diffraction grating whose refractive index is changed is formed directly in the optical fiber, the FBG has many advantages such as a low loss, a small size, a high reliability, and an affinity with an optical system based on optical fibers. The sharp wavelength-selective reflection characteristic of the FBG is utilized as being indispensable to the wavelength division multiplexing (WDM) optical-fiber communication technology in the field of optical communications. Moreover, since the reflection wavelength of the FBG exhibits strain and temperature dependencies, the FBG is utilized as a multiple high-resolution sensor for a strain or a temperature in the field of optical measurements.

Besides, the "SSFBG (Super Structure FBG)" is a device which is also called "sampled FBGs", and in which short FBGs of the same period are arrayed at equal spacings. The SSFBG has a structure in which a periodic structure of several mm (=sampling structure) is superposed on the wavelength-order periodic structures of the FBGs. That is, the SSFBG is a comb-type reflection light filter which has sharp wavelength-selective reflection characteristics at equal spacings determined by the period of the sampling structure. Since the SSFBG can collectively filter lights of multiple wavelengths used in the WDM communications, it is suited to the wavelength division multiplexing (WDM) optical-fiber communications, and the price reduction and structural simplification of a WDM system can be expected.

However, some of FBGs theoretically proposed cannot be easily produced because of the limitations of production technology. One of the productional limitations is that the production of a long FBG is difficult. The super structure fiber Bragg grating (SSFBG) is an example of the long FBG. In order to broaden the band of the SSFBG and heighten the channel density thereof in adaptation to the WDM optical communications enlarging in capacity, along SSFBG whose total length is several cm to several tens cm is required. With a prior-art method, however, the length of the SSFBG is limited by the length of a phase mask, and hence, the production of the long SSFBG is difficult.

In view of the above drawback, the present invention has for its object to provide a production method and a production device for a super structure fiber Bragg grating as are not limited by a phase mask length.

According to the first solving means of the present invention, there is provided a method of producing an optical-fiber grating, comprising the step of:

fixing a relative position between an optical fiber and a phase mask formed with gratings, to a first position;

forming interference light of predetermined grating width through the phase mask by an ultraviolet beam from a laser, at the first position, and irradiating the optical fiber with the interference light in one portion or in a plurality of portions at a predetermined grating spacing, thereby to form one or more first optical-fiber gratings;

moving the phase mask and/or the optical fiber in a lengthwise direction of the optical fiber, and fixing the relative position between the phase mask and the optical fiber, to a second position;

forming interference light of predetermined grating width through the phase mask by the ultraviolet beam from the laser, at the second position, and irradiating the optical fiber with the interference light in one portion or in a plurality of portions at predetermined the grating spacing, thereby to form one or more second optical-fiber gratings; and irradiating the optical fiber with the ultraviolet beam from the laser without intervention of a phase mask, in an interspace between the first optical-fiber grating and the second optical-fiber grating in order to adjust a phase shift, thereby to form a phase shifting region.

According to the second solving means of the present invention, there is provided a production device for an optical-fiber grating, comprising:
- a laser which projects an ultraviolet beam;
- a slit which adjusts a width of the ultraviolet beam from the laser;
- a phase mask which is formed with gratings;
- a translation section which fixes a relative position between an optical fiber and the phase mask, to each of a first position and a second position; and
- an irradiation adjustment section which forms interference light of predetermined grating width through the slit and the phase mask by the ultraviolet beam from the laser, and to irradiate the optical fiber with the interference light in one portion or in a plurality of portions at a predetermined grating spacing.

DESCRIPTION OF THE PREFERRED EMBODIMENTS

1. Fabrication of FBG

An FBG needs to form a perturbation having a period of, for example, about 500 [nm], within the core of a fiber. A phase-mask method and a photosensitivity for realizing this perturbation will be described below.

Figure 1:
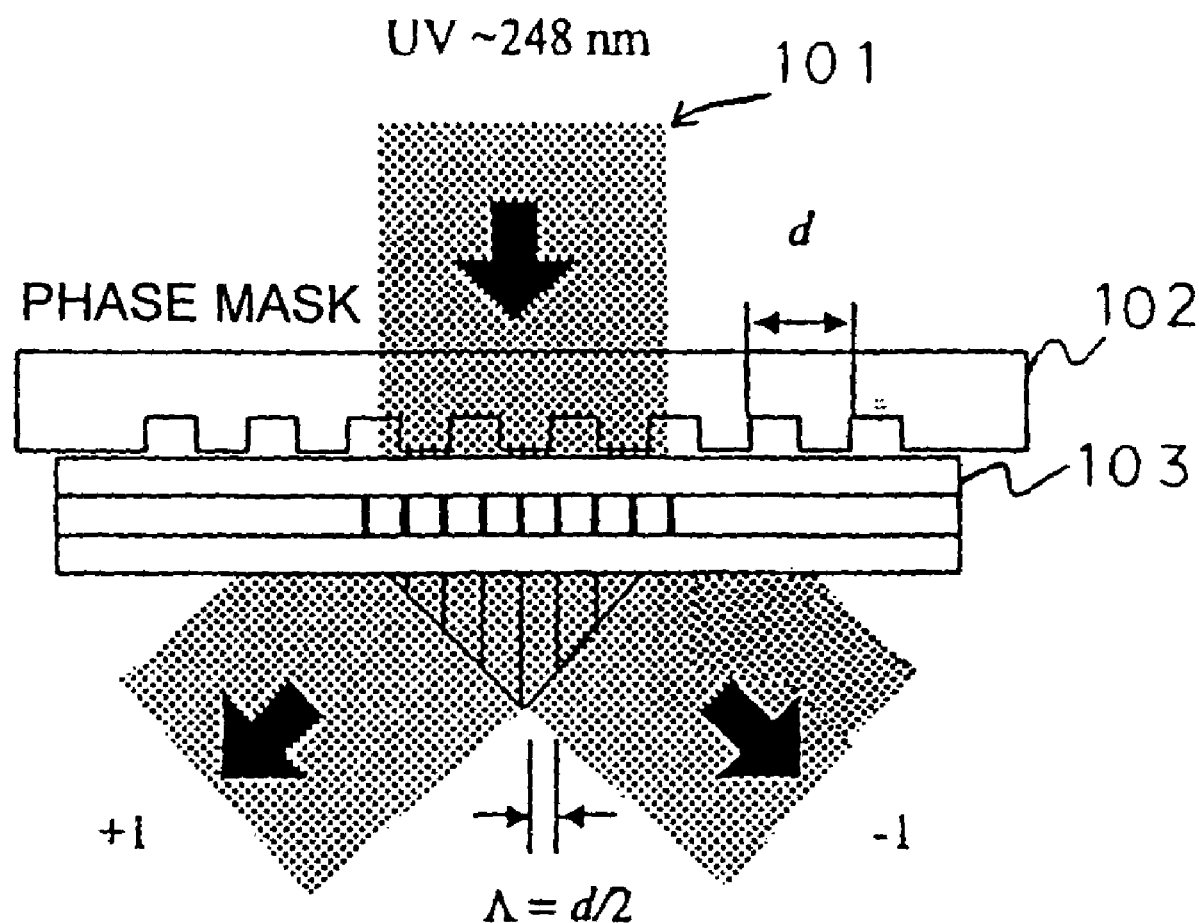
FIG. 1 is an explanatory view concerning the production of an FBG based on a phase-mask method.

Shown in FIG. 1 is an explanatory view concerning the production of an FBG based on the phase-mask method. There are illustrated an ultraviolet beam 101 from a laser, a phase mask 102, and an optical fiber 103. Incidentally, materials and various data to be mentioned below indicate examples, and the invention shall not be restricted to them. The change of a refractive index is utilized as the sort of the perturbation. A germanium-doped (Ge-doped) optical fiber has the nonlinear property that, when it is irradiated with ultraviolet radiation, the refractive index thereof is changed. This property is called the "photosensitivity", and the FBG is produced by utilizing the nonlinear phenomenon. In order to bring out the photosensitivity to the utmost, the optical fiber 103 is let stand for about two weeks in a hydrogen atmosphere of, for example, 120. Here, the Ge-doped optical fiber subjected to the hydrogenation is employed.

The intensity distribution of ultraviolet radiation having a predetermined period of, for example, 500 [nm] can be realized by the phase-mask method. The phase mask 102 in which a quartz substrate is formed with ruggedness of pitch d by electron-beam lithography as shown in the figure, is used in the phase-mask method. The ultraviolet beam 101 (UV beam) entered perpendicularly to the phase mask 102 is split into diffracted lights of +1st order and −1st order when passing through this phase mask 102, and the diffracted lights form interference fringes (intervals d/2). If the depth and shape of each groove are appropriate, 0th-order light (light transmitted directly) will become less than several %.

The advantages of the phase-mask method are that the same masks can be manufactured at a high reproducibility, and that even a laser of low temporal coherence is usable. Moreover, the phase-mask method is comparatively easier in alignment than any other method, and it is considered to be currently the optimal method for a KrF excimer laser which is employed as an example in this embodiment.

2. Detailed Production System

Figure 2:
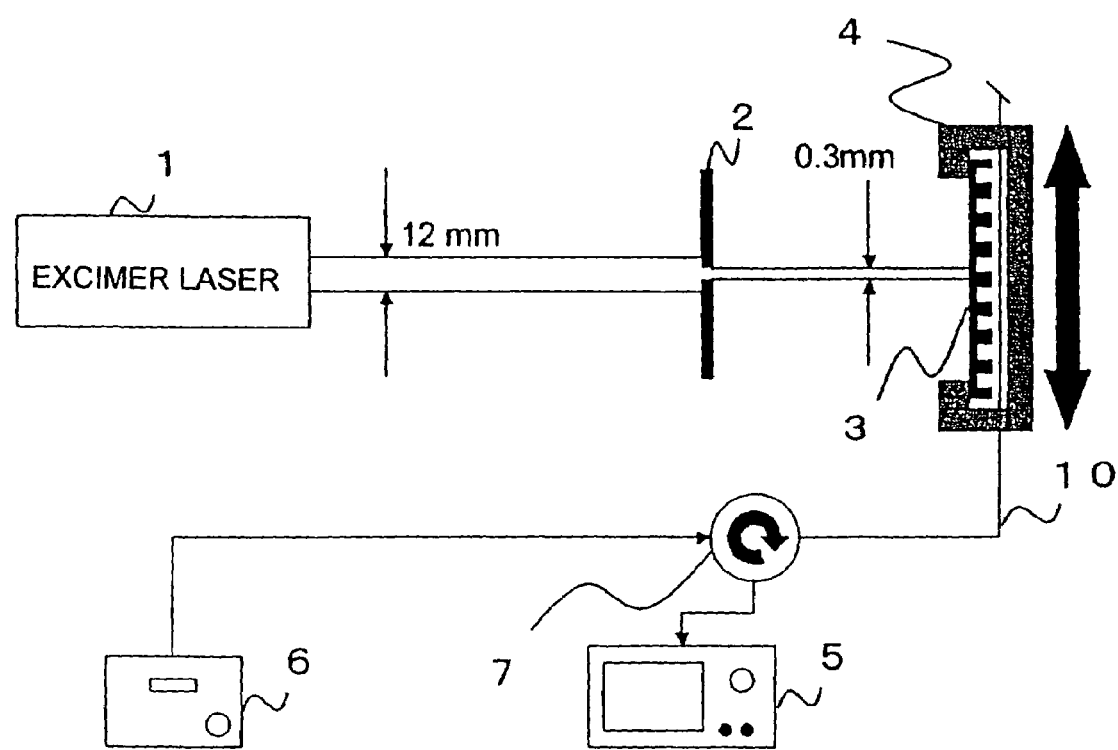
FIG. 2 is an architectural diagram of a production system for an SSFBG.

Shown in FIG. 2 is an architectural diagram of a production system for an SSFBG.

The architecture includes a laser 1, a slit 2, a phase mask 3, a translation stage 4, an optical spectrum analyzer 5, an EDFA 6 and a circulator 7. An optical fiber 10 is fixed on the translation stage 4 in a manner to be concealed by the phase mask 3.

A high power density and a high interferability are desired of the laser 1 as an ultraviolet light source which is employed for changing the refractive index of the fiber. Here, a KrF excimer laser which generates ultraviolet light pulses is employed as an example. Incidentally, an ArF excimer laser, the SHG (second-harmonic generation) of an argon laser, a copper vapor laser, or the like may well be employed otherwise than the KrF excimer laser. The excimer laser or the copper vapor laser is a pulse laser, whereas the SHG of the argon laser is a continuous oscillation laser, and either may well be employed. By way of example, the KrF excimer laser employed in this embodiment has a wavelength of 248 nm, a pulse repetition frequency of 100 Hz, energy of about 55 mJ per pulse, and a beam diameter of 6×12 mm.

Also, by way of example, the slit 2 narrows an ultraviolet beam being 12 mm wide, into 0.3 mm, so as to irradiate the optical fiber with the narrowed beam through the phase mask. The phase mask 3 is, for example, one in which diffraction gratings are depicted at a pitch of about 0.5 micron on glass.

An optical fiber as stated below can be used as the fiber 10. By way of example, the fiber 10 should preferably be a fiber the ultraviolet-induced index change of which is large. Since the change is small in an ordinary optical fiber, it can be enhanced by hydrogenation (the optical fiber is let stand in high-pressure hydrogen for 1–2 weeks so as to be loaded with hydrogen). Besides, it is known that, as the Ge (germanium) doping amount of the core of the optical fiber is larger, the ultraviolet-induced index change is larger. It is therefore possible to use a heavily Ge-doped optical fiber for an FBG. The heavily Ge-doped optical fiber for an FBG as subjected to the hydrogenation is used in this embodiment.

Alternatively, any of various fibers, such as a dispersion shifted fiber (DSF), a single-mode fiber (SMF) and a multi-mode fiber, can be used as the fiber 10.

Figure 3:
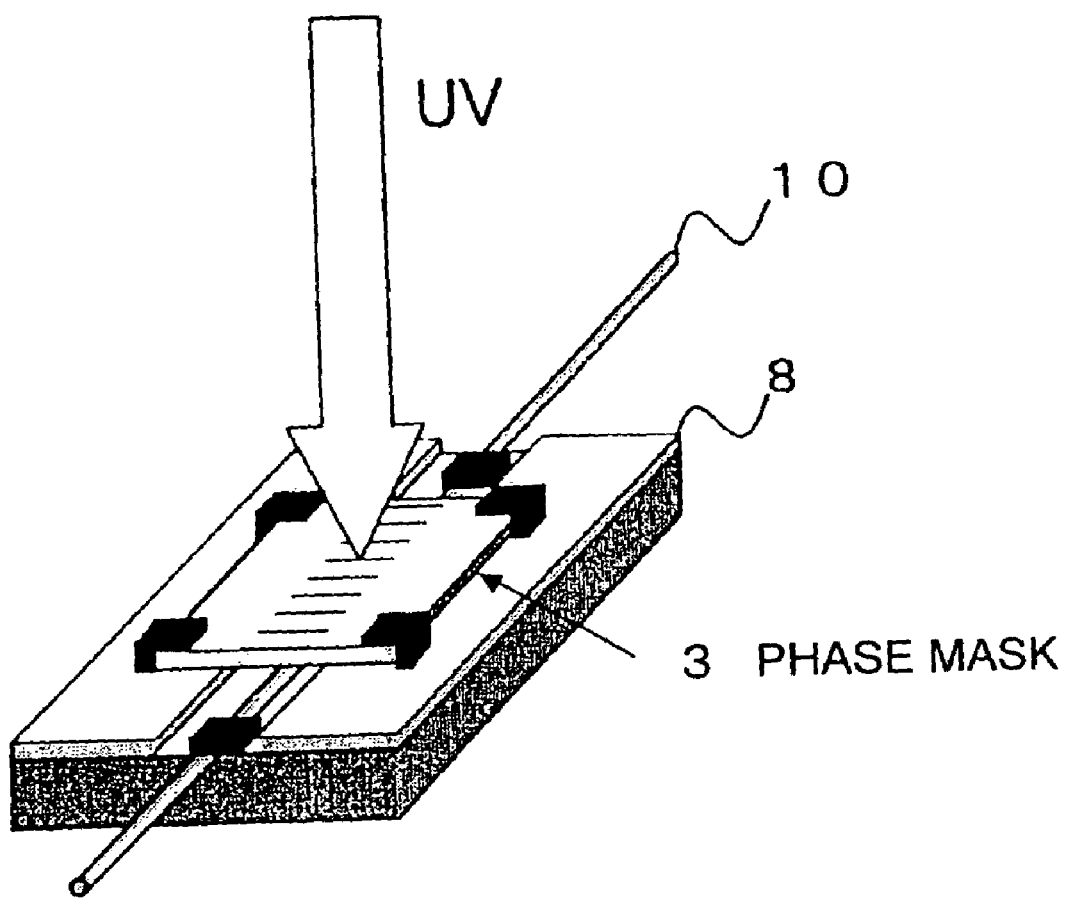
FIG. 3 is an explanatory view concerning the fixation between a phase mask and an optical fiber.

Shown in FIG. 3 is an explanatory view concerning the fixation between the phase mask and the optical fiber.

In this example, the phase mask 3 and the optical fiber 10 are fixed on an identical plate 8 so as to suppress relative vibrations. The plate 8 is fixed on the translation stage 4, and the movement magnitude of the translation stage 4 and the number of pulses are controlled, thereby to produce the FBG, the SSFBG or the like.

The way of the irradiation with the ultraviolet beam becomes as follows: When the uniform ultraviolet beam is caused to perpendicularly fall on the phase mask 3, diffracted lights of +1st order and −1st order based on the phase mask 3 create interference fringes of about 1 micron on the optical fiber. Owing to the ultraviolet-induced index change, a larger index change occurs in places where the interference fringes are intense, and a smaller index change occurs in places where the interference fringes are weak, so that the periodic structure of the refractive indices at about 1 micron (index diffraction gratings) is formed.

The clearer interference fringes are obtained by entering the parallel beam from the laser 1 into the phase mask 3 as stated above. As the ultraviolet beam or ultraviolet radiation pulses are projected, the gratings are formed in the core within the optical fiber 10. During the production, the ASE of the EDFA 6 being a wide-band light source is entered into the optical fiber 10, and the resulting reflected light is entered into the optical spectrum analyzer 5 via the circulator 7, whereby a reflected spectrum is monitored. Thus, the projection of the laser beam can be adjusted.

3. Phase Mask Scanning Method

Figure 4:
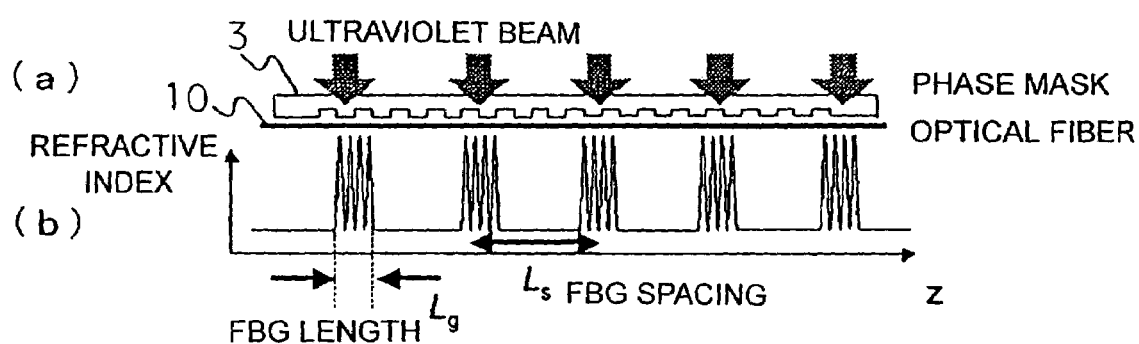
FIG. 4 is a conceptual view of the SSFBG.

First, the fundamentals of the SSFBG will be described. The conceptual view of the SSFBG is shown in FIG. 4. As shown in the figure, the SSFBG is produced in such a way that FBGs are discretely formed.

Shown in FIG. 4($a$) is a situation where the ultraviolet light is projected on the optical fiber 10 at a plurality of positions through the phase mask 3. Here, arrows denote ultraviolet beams. Although the plurality of ultraviolet beams are denoted by the arrows, the optical fiber is not irradiated with the plurality of beams at one time in this experiment, but the single ultraviolet beam (or the phase mask 3 as well as the optical fiber 10) is moved so as to depict the FBGs at only the necessary parts. Incidentally, it is also allowed to adopt an optical system arrangement in which a plurality of positions are irradiated with ultraviolet beams at one time. The laser beam is extracted at only necessary parts (each being of, for example, about 1 mm) by slits, whereupon the extracted beams are projected on the phase mask 3.

Shown in FIG. 4($b$) is a refractive index n at the position Z of the optical fiber 10. Here, $L_g$ denotes an FBG width, and $L_s$ an FBG spacing. Besides, each position at which the refractive index n is indicated by jaggedness in the figure is a place where the FBG is carved in the optical fiber 10.

Figure 5:
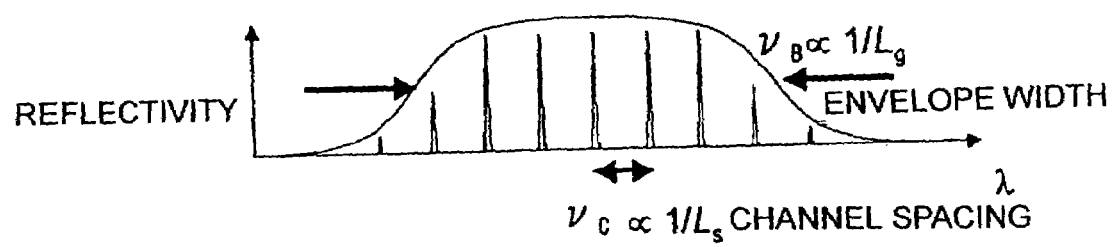
FIG. 5 is a characteristic diagram of the SSFBG.

The characteristic diagram of the SSFBG is shown in FIG. 5. Shown in the figure is the relationship between the refractive index n and a wavelength λ. Here, $v_B$ denotes an envelope width proportional to $1/L_g$, and $v_C$ a channel spacing proportional to $1/L_s$.

In this way, a reflection filter of comb type is formed as shown in the figure. The envelope width $v_B$ of comblike reflection spectra is inversely proportional to the length of each of the FBGs discretely produced, while the channel spacing $v_C$ is inversely proportional to the spacing $L_s$ of the FBGs produced. In order to attain a narrower channel spacing, therefore, the FBGs need to be discretely produced at a larger spacing. Incidentally, a single FBG may well be produced, and as the number of FBGs is larger, the reflectivity becomes higher. When the reflectivity reaches one, the envelope width broadens. Here, each of the comblike reflection spectra shall be called a "channel".

It is assumed by way of example that a super structure having a total length of 50 mm, a reflectivity of 100% and a channel spacing of 100 GHz be obtained. On this occasion, when it is intended to attain a channel spacing of 50 GHz, the grating spacing needs to be doubled, and the total length must be made 100 mm. Likewise, when the channel spacing is set at 33.3 GHz, the total length becomes 150 mm.

In this manner, the SSFBG is produced by discretely carving the FBGs. These FBGs must have a predetermined phasic relationship in their index modulation, and this is realized by discretely irradiating one fixed phase mask with the ultraviolet beam. Accordingly, the total length of the SSFBG is limited by the length of the phase mask. Next, a phase mask scanning method will be described as an SSFBG producing method which is not limited by the length of the phase mask.

Figure 6:
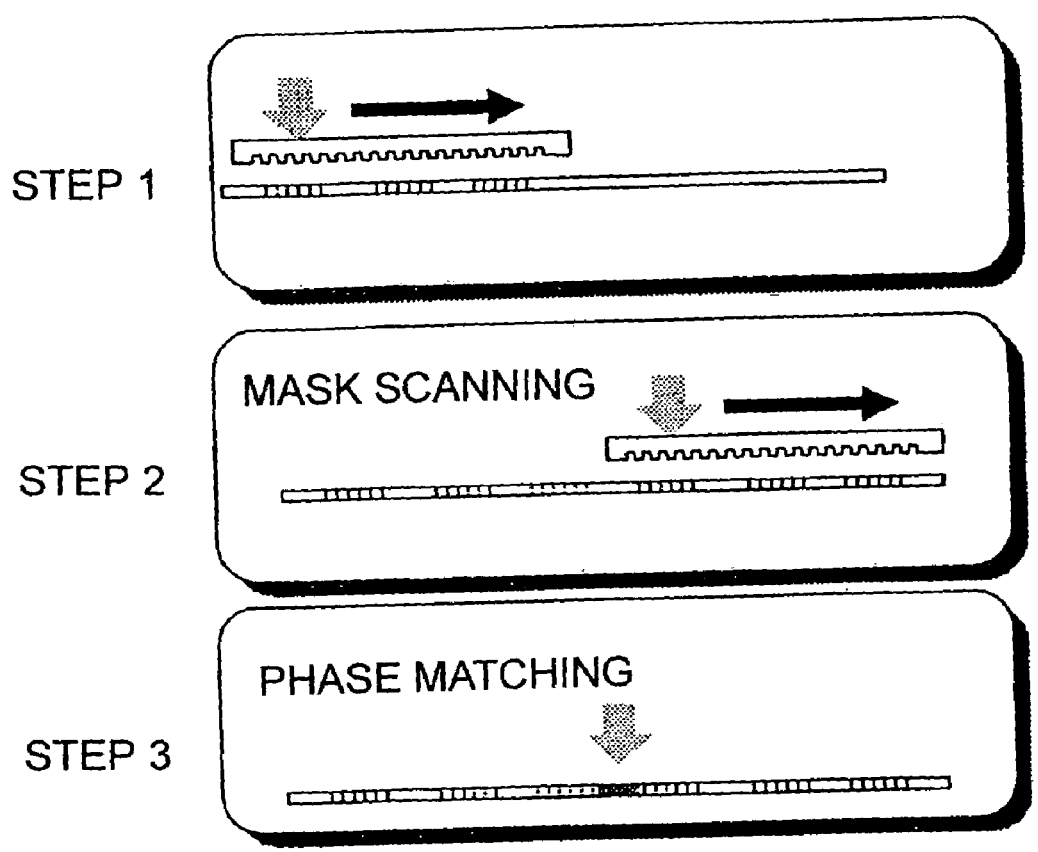
FIG. 6 is an explanatory view of an SSFBG producing method based on the scanning of a phase mask.
Figure 7:
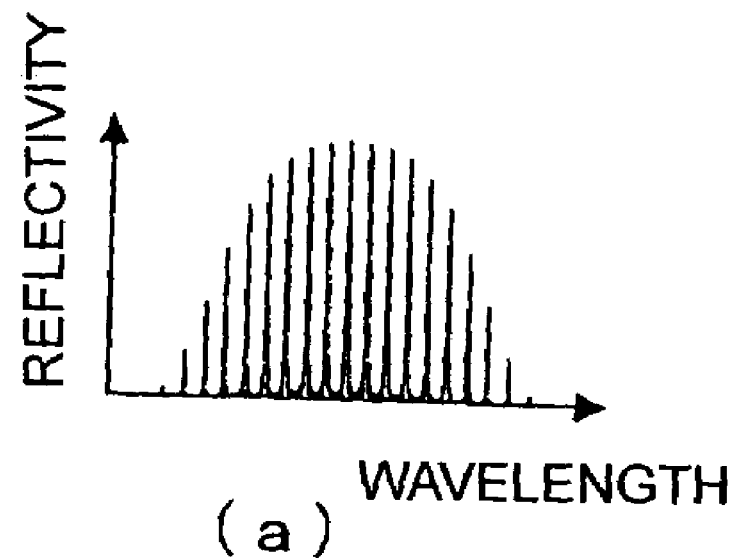
FIG. 7 shows characteristic diagrams of SSFBGs.
Figure 7:
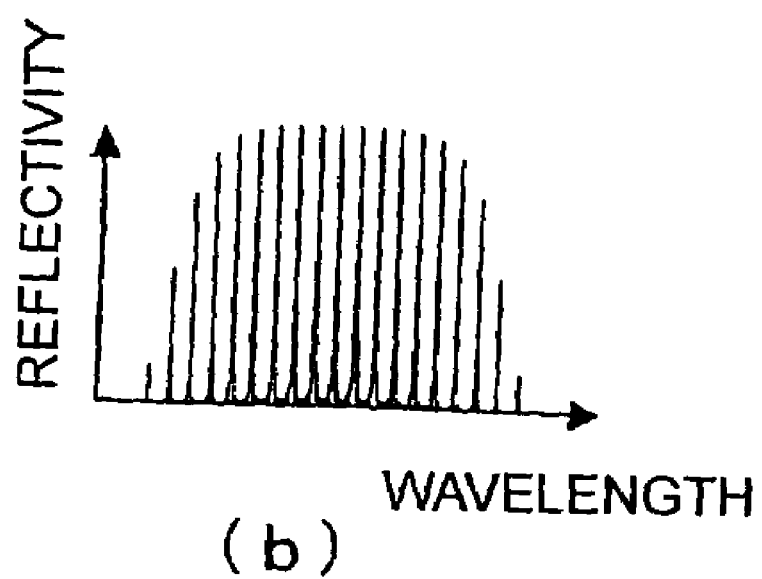

Shown in FIG. 6 is the explanatory view of the SSFBG producing method based on the scanning of the phase mask. Besides, shown in FIG. 7 are the characteristic diagrams of the SSFBG.

The practicable steps of the mask scanning will be explained below.

In the above, the relative position between the mask and the optical fiber is fixed, and the beam is allowed to scan, so that any SSFBG whose length exceeds the length of the mask cannot be depicted. Therefore, first of all, as in FIG. 4, the beam is allowed to scan with the relative position between the mask and the optical fiber fixed (step 1). The characteristic diagram of the SSFBG in this case is shown in FIG. 7($a$). Subsequently, the relative position between the mask and the optical fiber is moved in the lengthwise direction of the optical fiber (step 2). Besides, the beam is allowed to scan with the relative position between the mask and the optical fiber fixed as at the step 1. A construction for the scanning can be realized by, for example, fixing the mask and the optical fiber to translation stages separate from each other and individually moving the translation stages by a PC control. Next, in order to correct and match a phase deviation, the mask is removed, and a uniform ultraviolet beam is applied to the optical fiber, whereby a refractive index can be uniformly changed, and the optical length of the corresponding portion is changed to impart a phase shift (step 3). The phase shift-imparting position may be any suitable place between a first SSFBG and a second SSFBG. A phase shift amount is determined by an ultraviolet beam irradiation time (or light pulse number), and if a necessary phase shift amount has been attained is determined while a reflection spectrum is being observed. An SSFBG of free length can be fabricated by repeating the above steps. As shown in FIG. 7($b$), in a case where the reflectivity of the original SSFBG is close to one, the envelope width broadens after the step 3.

This phase mask scanning method has been verified. An SSFBG of $L_g$=0.3 mm and $L_s$=3.0 mm was produced by employing a KrF excimer laser (248 nm) as a UV light source, and setting the pitch of a phase mask at 1074 nm.

Figure 8:
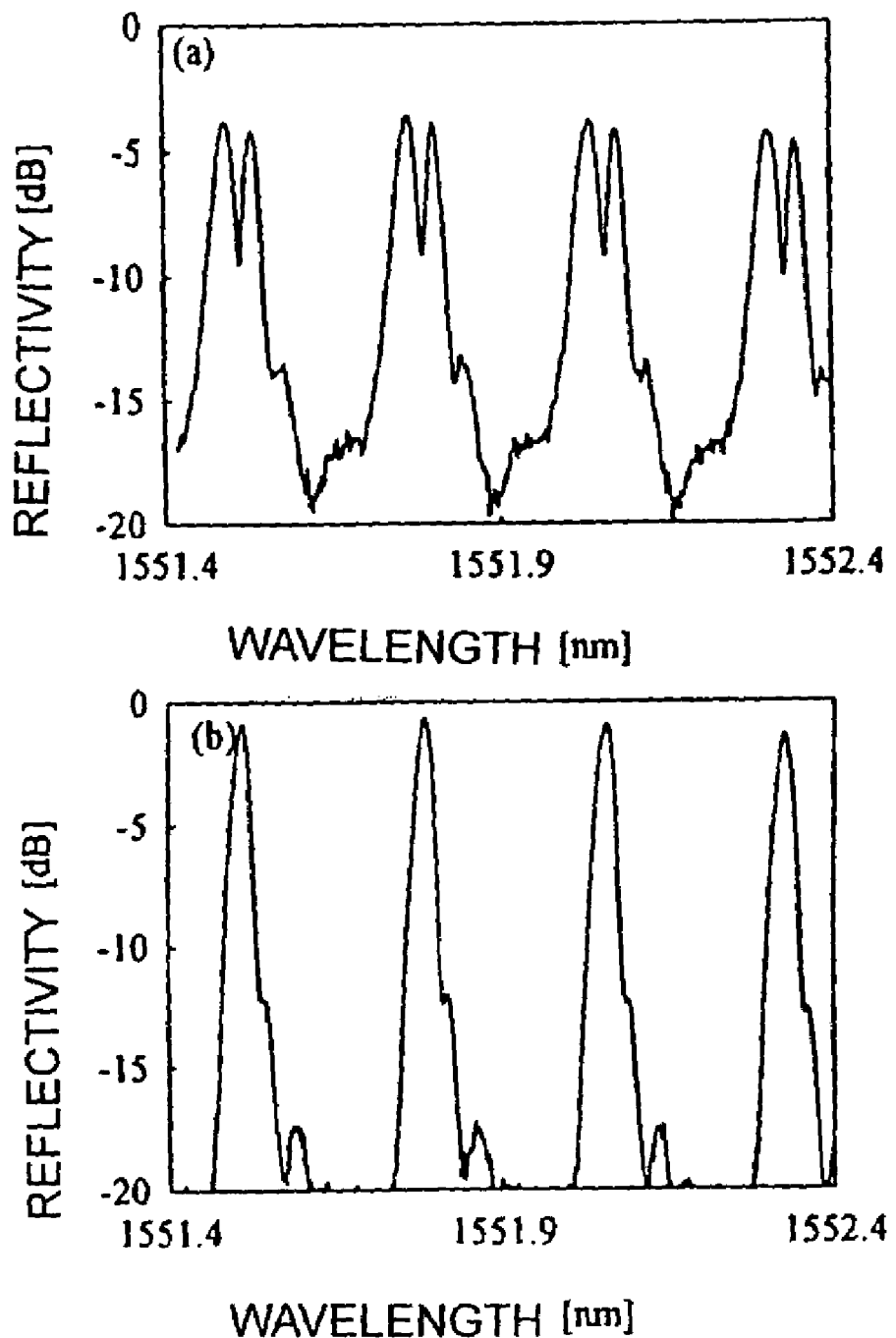
FIG. 8 shows reflection spectrum diagrams before and after ultraviolet beam irradiation for phase matching.

Shown in FIG. 8 are reflection spectrum diagrams before and after ultraviolet beam irradiation for phase matching. As shown in FIG. 8($a$), before the matching is established, that is, in a case where two SSFBGs are coupled by simply scanning the phase mask, the two SSFBGs interfere with each other, and hence, each reflection peak fissures. Therefore, when the phase matching is thereafter established, an ideal comb-type filter can be realized as seen from FIG. 8(b). Moreover, superfluous sidelobes outside a reflection band as have appeared greatly before making the phase adjustment can be suppressed by the phase adjustment. Accordingly, the SSFBG which has the same characteristic as that of an SSFBG produced by a phase mask of double length can be produced by scanning the phase mask.

Figure 9:
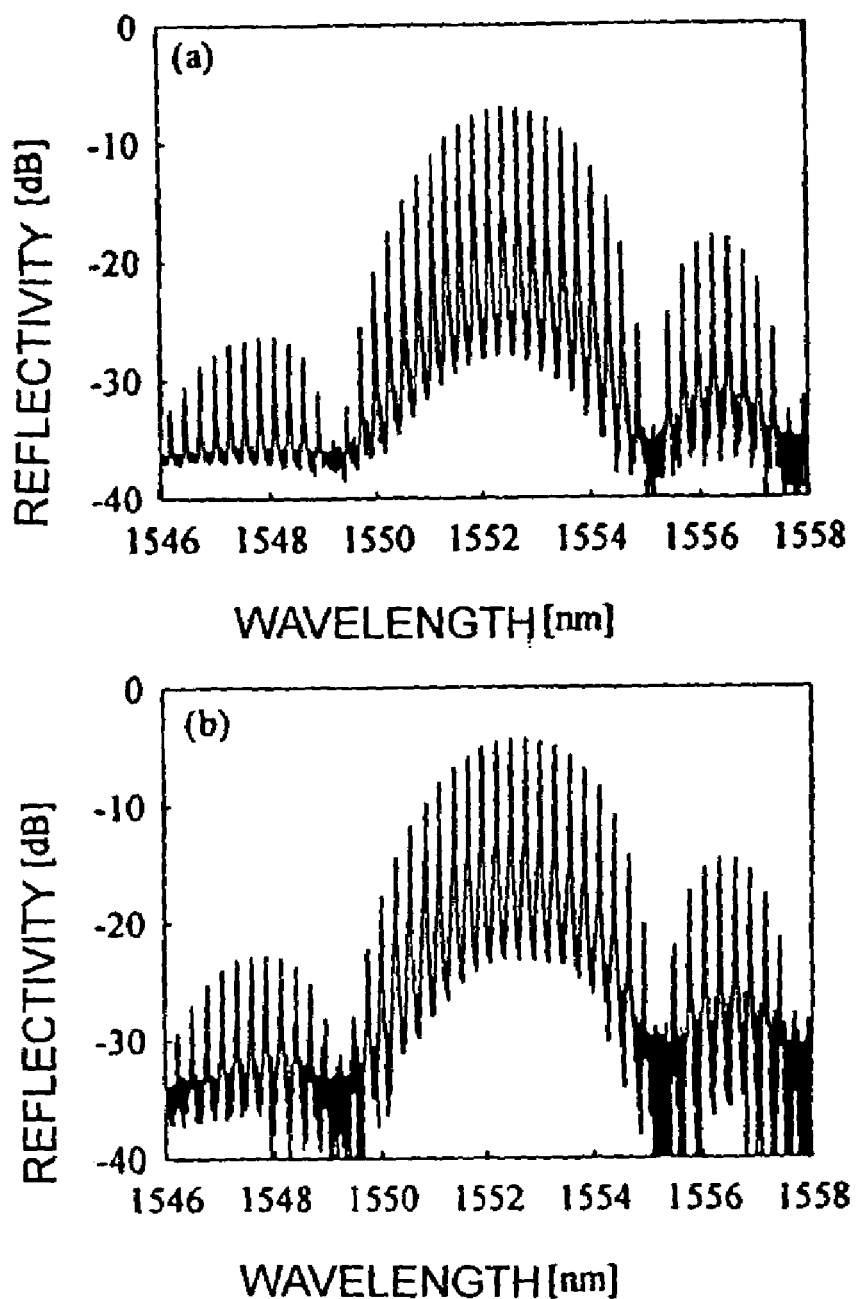
FIG. 9 shows reflection spectrum diagrams of SSFBGs.

Next, the reflection spectrum diagrams of SSFBGs are shown in FIG. 9. FIG. 9(a) is the reflection spectrum diagram of the SSFBG having a length of 30 mm as produced by the prior-art method, while FIG. 9(b) is the reflection spectrum diagram of the SSFBG in which three SSFBGs as shown in FIG. 9(a) have been coupled into a length of 90 mm by the scanning phase mask method. As seen from the figure, the SSFBGs form a fine comb-type filter even after the coupling. In this manner, in a case where the reflectivity of the original SSFBG is small, the reflectivity heightens without changing the envelope width.

4. Chirped-SSFBG

Although the ordinary SSFBG in which the FBGs having the same index modulation periods are discretely produced has been produced in the above embodiment, various SSFBGs can be produced with the phase-mask scanning method. A chirped-SSFBG, for example, can be produced especially easily. The "chirped-SSFBG" is such that FBGs whose index modulation frequencies are changed little by little are discretely produced. The frequencies themselves to be changed are endowed with a periodicity, whereby a comb-type reflection light filter of wide band can be realized. Besides, the chirped-SSFBG can be applied to a dispersion compensator for an optical fiber.

Figure 10:
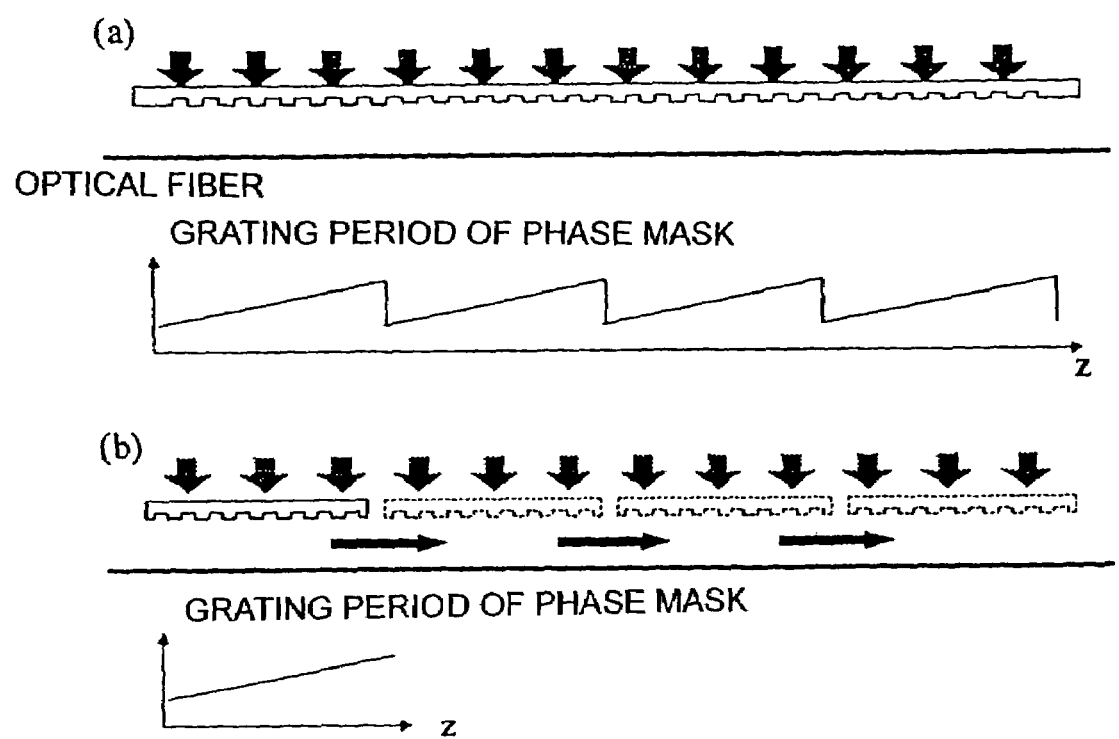
FIG. 10 shows explanatory views of methods of producing chirped-SSFBGs.

Next, comparisons will be made between the steps of producing the chirped-SSFBG based on the phase mask fixing method in the prior art and the steps of production based on the phase mask scanning method proposed this time. Shown in FIG. 10 are the explanatory views of the methods of producing the chirped-SSFBGs. FIG. 10(a) shows a chirped-SSFBG producing method based on the phase mask fixing method in the prior art, while FIG. 10(b) shows a chirped-SSFBG producing method based on the scanning phase-mask method in this embodiment. A plurality of arrows indicate the outputs of ultraviolet beams. The plurality of beams are not projected at one time, but a single ultraviolet beam is moved so as to depict the FBGs at only necessary parts. Incidentally, a plurality of beams may well be projected at the same time. Used as a phase mask is one whose grating period changes.

With the phase mask fixing method in the prior art, a phase mask having the same length as that of the chirped-SSFBG to-be-produced is necessary, and the phase mask in which the period of diffraction gratings changes periodically as shown in FIG. 10(a) needs to be fabricated. In contrast, according to this embodiment, a phase mask which is short (for example, several-tenths of the total length) may exist, and a single phase mask for a simple chirped-FBG suffices. Besides, an optical fiber is irradiated with a plurality of ultraviolet beams through the short phase mask, and the phase mask is thereafter shifted laterally so as to irradiate the optical fiber again. Although this embodiment is similar to the foregoing embodiment, the former differs from the latter in the SSFBG which is depicted. Also, uniform irradiation with the ultraviolet beams for phase matching at the plurality of positions of the phase mask is required as in the foregoing.

The long phase mask which is necessary for producing the ordinary SSFBG, the chirped-SSFBG or the like, undergoes errors in the periodicity of grooves (diffraction gratings) more or less at the fabrication stage thereof. This is ascribable to the limitation (stitching error) of the fabrication technology of phase masks at the current time. The designability of the SSFBG is worsened by the errors. In contrast, this embodiment employs the short phase mask and is therefore capable of producing the SSFBG by the phase mask in which the periodicity of grooves (diffraction gratings) is almost errorless. Also in this point, the phase mask scanning method is an effective SSFBG production method.

5. Multiple Phase Shift Method

Next, there will be described an SSFBG (MPS-SSFBG) which is based on a multiple phase shift (MPS-SSFBG=Multiple phase shift SSFBG) method. Although the MPS-SSFBG is a reflection comb-type filter likewise to the ordinary SSFBG, it consists in an epoch-making method which can realize the same characteristic with a length shorter than that of the prior-art SSFBG. Since an SSFBG is manufactured by discretely producing FBGs, the spacings of the individual FBGs become long in a high-density SSFBG of narrow channel spacings, and the corresponding parts become wasteful. In the MPS method of this embodiment, therefore, appropriate phase shifts are imparted between the FBGs, whereby channel spacings can be narrowed with FBG spacings held short, and an optical fiber can be efficiently used.

As stated before, the envelope width of comblike reflection spectra is inversely proportional to the length of each of the FBGs discretely produced, and the channel spacing is inversely proportional to the spacing of the FBGs produced. In order to attain a narrower channel spacing, the FBGs need to be discretely produced at a larger spacing. It is assumed by way of example that a super structure having a total length of 50 mm, a reflectivity of 100% and a channel spacing of 100 GHz be obtained. On this occasion, when it is intended to attain a channel spacing of 50 GHz, the grating spacing, namely, the FBG spacing needs to be doubled, and the total length must be made 100 mm. Likewise, when the channel spacing is set at 33.3 GHz, the total length becomes 150 mm.

In contrast, the MPS-SSFBG of this embodiment is such that the appropriate places of the ordinary SSFBG are endowed with the phaseshifts. It consists in a method in which channel spacings can be narrowed into high-density channels, without considerably lowering an overall reflectivity and with the total length of the SSFBG kept. That is, even when the channel spacing is narrowed as 100 GHz, 50 GHz and 33.3 GHz, the total length does not change.

The steps of designing the MPS-SSFBG will be described below. To begin with, the SSFBG in the embodiment as described before is designed on the basis of a channel spacing, a band, etc. which are to be attained. On this occasion, it is assumed that an SSFBG in which the spacing of individual FBGs is $L_s$, the length of each FBG is $L_g$, and the number of the FBGs is $N_{FBG}$, and whose total length is $L_{SSFBG}$ ($\approx L_g L_s \times N_{FBG}$) have been produced. The ordinary SSFBG inevitably enlarges in its total length because the interspaces between the individual FBGs are not effectively utilized. Accordingly, steps required for integrating FBGs anew in such interspaces between the FBGs, thereby to realize the MPS-SSFBG and to make its total length 1/m (m=2, 3, . . . ), will be explained below.

First, the FBG spacing $L_s$ attained by the preceding design is shortened to 1/m, and the $N_{FBG}$ FBGs are discretely produced, thereby to make the total length 1/m. In this state left intact, a channel spacing broadens m times. Therefore, the phase shift $\phi_k$ of the following equation is imparted between the kth FBG and (k+1)th FBG:

$$\phi_k = 2\pi(k-1)/m$$

$$(0 \leq k \leq N_{FBG}).$$

When part of an optical fiber is irradiated with a uniform ultraviolet beam, the refractive index of the part changes uniformly, so that the optical length nL of the part changes, and the phase shift occurs. Here, the "phase shift" signifies that the phase rotation of light at the part changes (shifts). If each necessary phase shift amount, such as 0, $2\pi/3$ or $4\pi/3$, has been achieved, is determined while a reflection spectrum is being observed by employing an optical spectrum analyzer.

Figure 11:
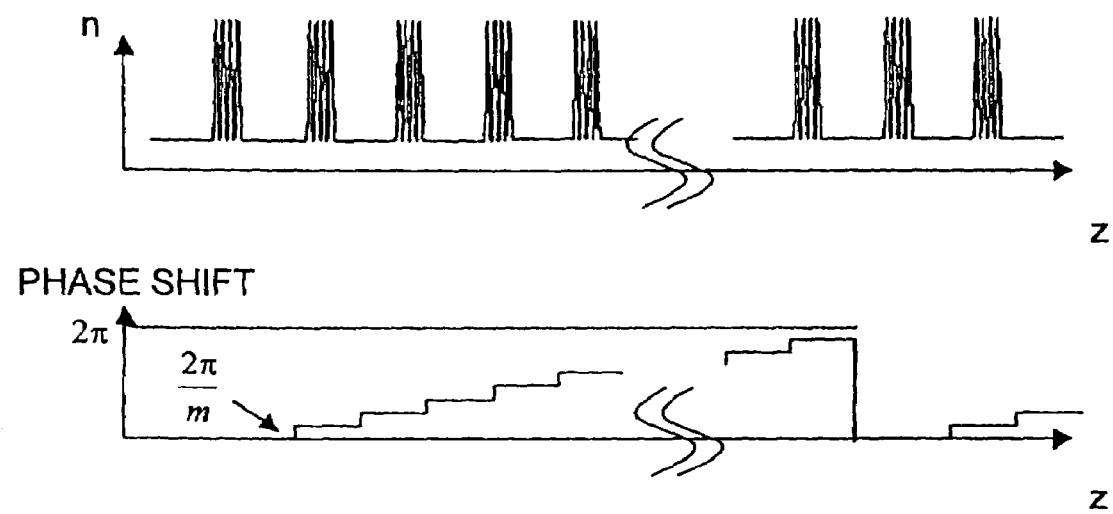
FIG. 11 shows explanatory views of a refractive index and a phase shift in the axial direction of an optical fiber in an MPS-SSFBG.

Here, the explanatory views of the refractive index and the phase shift in the axial direction of the optical fiber in the MPS-SSFBG are shown in FIG. 11.

Sawlike phase shift amounts as shown in the figure are imparted in accordance with the above equation. When the phase shift amount to be imparted exceeds $2\pi$, it can be turned back. Thus, the total length can be made 1/m with the channel spacing held as designed and with the reflectivity held substantially unchanged.

Figure 12:
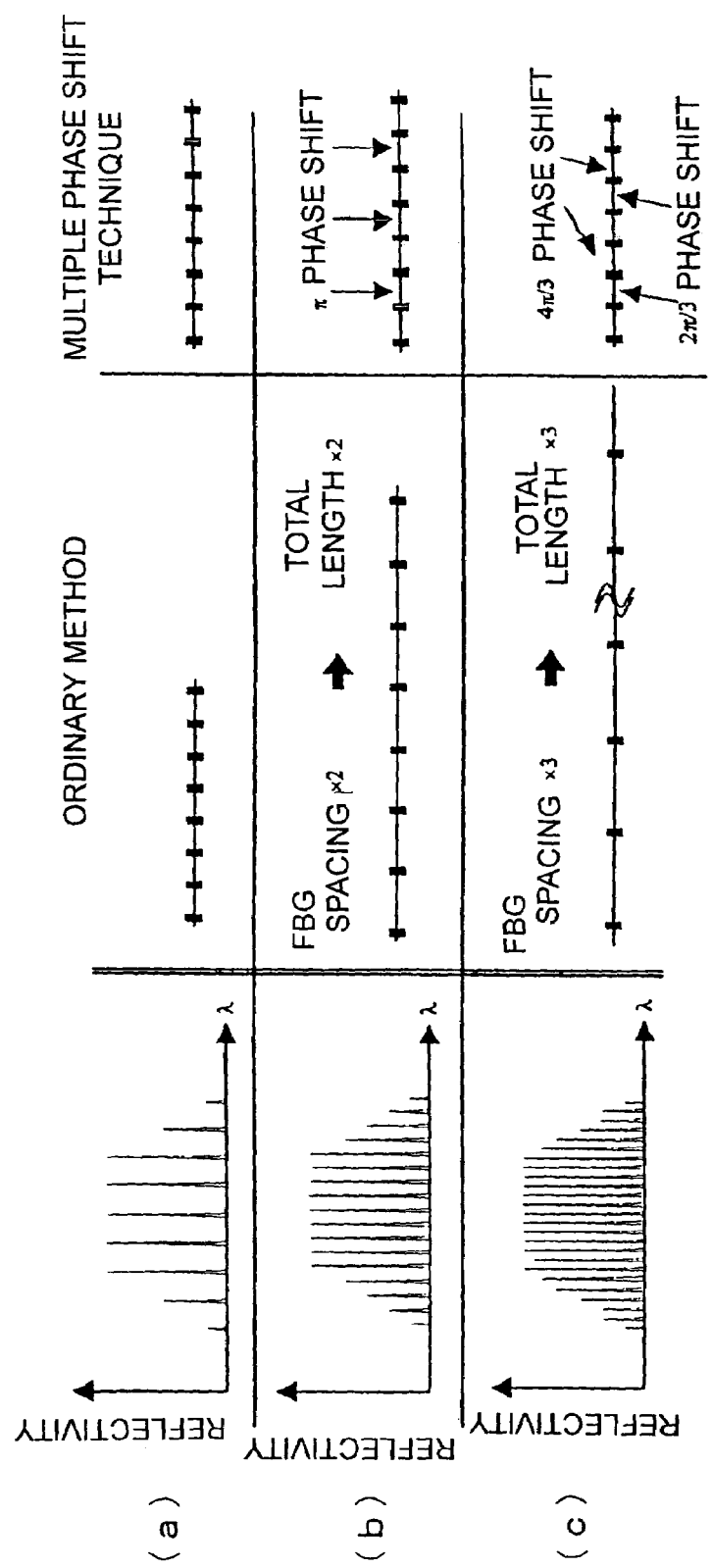
FIG. 12 shows explanatory views concerning the comparisons between SSFBGs and MPS-SSFBGs.

Next, explanatory views concerning SSFBGs and MIPS-SSFBGs are shown in FIG. 12. This figure makes the comparisons between the SSFBGs and the MPS-SSFBGs in the cases of m=2 and 3. In FIG. 12, left diagrams show reflectivities versus wavelengths, middle diagrams show the SSFBGs produced by the ordinary method or the foregoing embodiment, and right diagrams show the SSFBGs based on the multiple phase shift technique.

FIG. 12(a) illustrates a case where each SSFBG has its original length and is not endowed with any phase shift. FIG. 12(b) illustrates a case where each FBG spacing is doubled (m=2). On this occasion, each channel spacing becomes ½ (1/m). According to the ordinary or foregoing SSFBG production method, the total length becomes double, whereas with the MPS-SSFBG, the channel spacing can be made ½ (1/m) with the total length held unchanged, by imparting phase shifts of 0, $\pi$, . . . between individual FBGs. Likewise, FIG. 12(c) illustrates a case where each FBG spacing is trebled (m=3). On this occasion, each channel spacing becomes ⅓ (1/m). The channel spacing can be made ⅓ (1/m) with the total length held unchanged, by imparting phase shifts of 0, $2\pi/3$, $4\pi/3$, . . . between individual FBGs.

Each of the MPS-SSFBGs has been verified. The MPS-SSFBG was produced in accordance with the phase mask fixing method by employing a KrF excimer laser (248 nm) as a UV light source. The MPS-SSFBG produced this time had m=2, $L_g$=0.3 [mm], $L_s$=3.0 [mm] and $N_{FBG}$=15, and the pitch of a phase mask was 1074 [nm].

Figure 13:
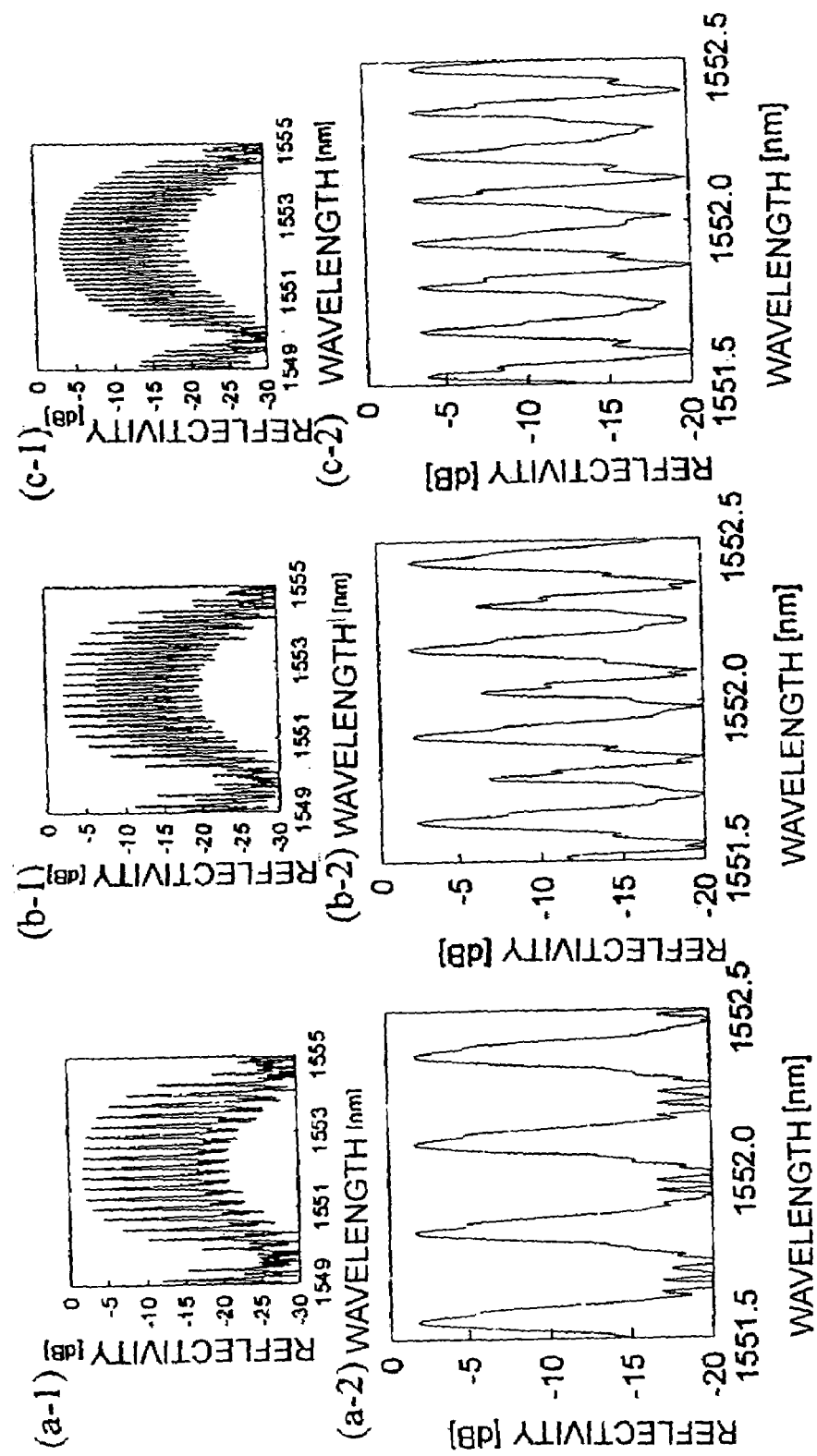
FIG. 13 shows explanatory views of the production of an MPS-SSFBG (m=2).

Shown in FIG. 13 are the explanatory views of the production of the MPS-SSFBG (m=2). The production is a case corresponding to FIG. 12(b). First, the reflection spectra of an SSFBG before being endowed with phase shifts as produced in accordance with the ordinary SSFBG production method are shown in FIGS. 13(a-1 and -2). FIGS. 13(a-, b- and c-2) are enlarged diagrams of FIGS. 13(a-, b- and c-1). In this example, the MPS-SSFBG of m=2 was produced, and hence, phase shift amounts imparted between gratings became $\phi_k$=0, $\pi$, 0, $\pi$, 0, $\pi$, 0, $\pi$, . . .

Reflection spectra in that state before the phase shifts of $\pi$ were completely imparted, namely, in an intermediate process, in which phase shifts of $\phi_k \approx 0$, $\pi/2$, 0, $\pi/2$, 0, $\pi/2$, 0, $\pi/2$, . . . were imparted, are shown in FIGS. 13(b-1 and -2). A situation where new channels were grown between original channels, is seen from the figures. Reflection spectra in the case where the designed phase shifts were completely imparted finally, are shown in FIGS. 13(c-1 and -2). When these figures are compared with FIGS. 13(a-1 and -2), it is seen that each channel spacing became half, so the reflection spectrum as designed was attained.

Figure 14:
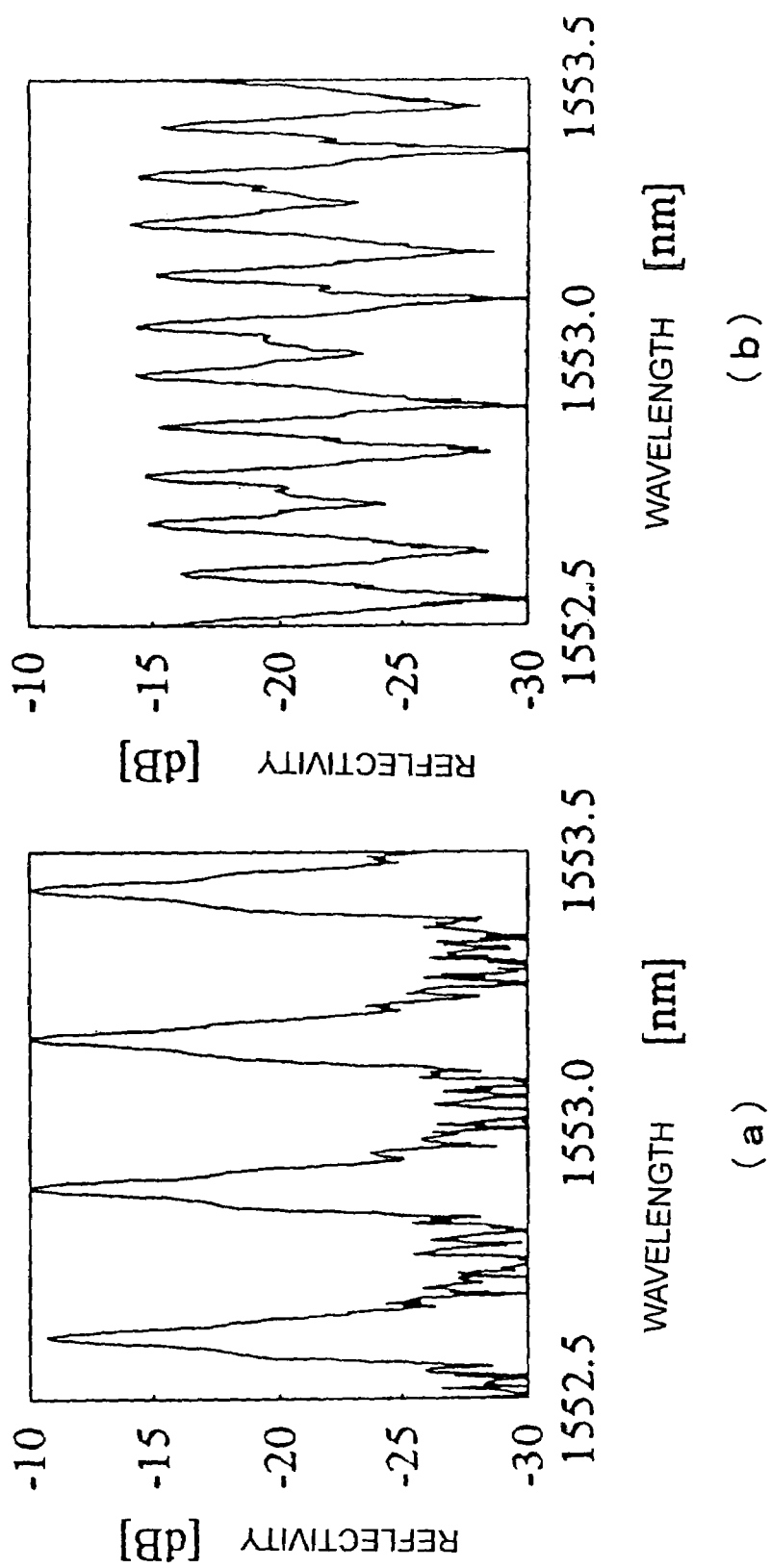
FIG. 14 shows explanatory views of the production of an MPS-SSFBG (m=3).

Shown in FIG. 14 are the explanatory views of the production of the MPS-SSFBG (m=3). The production is a case corresponding to FIG. 12(c). First, the reflection spectrum of an SSFBG before being endowed with phase shifts as produced in accordance with the ordinary SSFBG production method is shown in FIG. 14(a). In this example, the MPS-SSFBG of m=3 was produced, and hence, phase shift amounts imparted between gratings became $\phi_k$=0, $2\pi/3$, $4\pi/3$, 0, $2\pi/3$, $4\pi/3$, 0, . . . A reflection spectrum in the case where the designed phase shifts were completely imparted finally, is shown in FIG. 14(b). When this figure is compared with FIG. 14(a), it is seen that each channel spacing became ⅓, so the reflection spectrum as designed was attained.

When the MPS-SSFBG is adopted, the number of channels can be increased several times into a high-density SSFBG. Moreover, since the optical fiber and the phase mask can be effectively used, the MPS-SSFBG leads to curtailment in the cost of production. Owing to the recent enhancement of microfabrication technology, it is permitted to precisely endow a phase mask with phase shifts. Accordingly, an optical-fiber comb-type reflection filter of high-density channels can also be produced even by a short phase mask in such a way that the phase mask itself is endowed with the phase shifts which are imparted in producing the MPS-SSFBG.

In the above description, in order to bestow the optical fiber with the desired phase shifts, the laser output is adjusted while the optical spectrum analyzer is being observed. It is also possible to automatically execute the adjustment by a computer.

Figure 15:
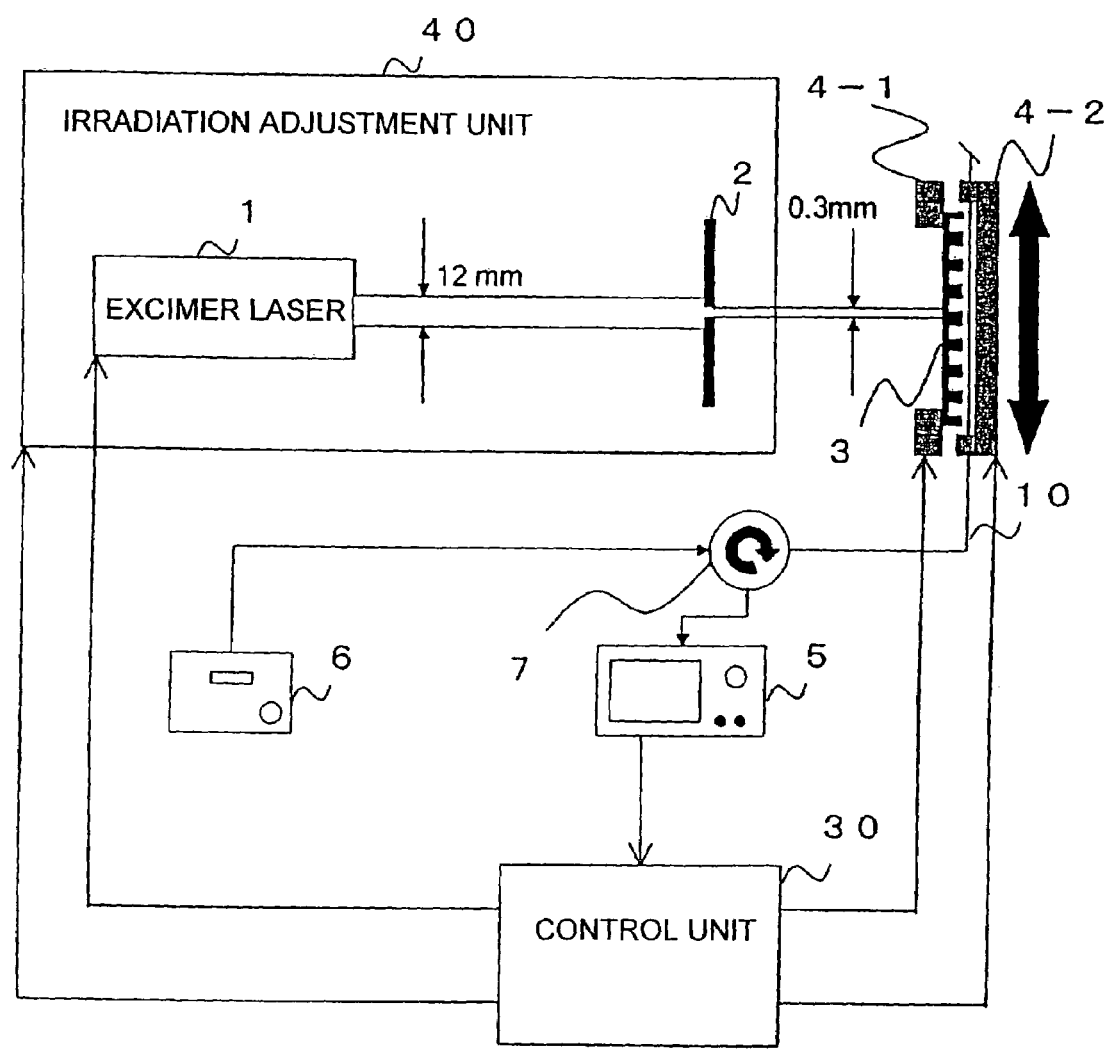
FIG. 15 is another architectural diagram of a production device.

Another architectural diagram of a production device is shown in FIG. 15. The production device is such that a control unit 30 and an irradiation adjustment unit 40 are further disposed in the architecture of the production device in the foregoing embodiment, and that the translation stage 4 is substituted by a translation stage for a phase mask, 4-1 and a translation stage for an optical fiber, 4-2.

The control unit 30 receives the measured result of the optical spectrum analyzer 5 as its input through an internal interface. Any or more of the output time, pulse energy, repetition frequency, beam size, etc. of the laser 1 is/are adjusted on the basis of the inputted reflectivity for the wavelength. Further, the control unit 30 can control the irradiation adjustment unit 40 so as to irradiate a predetermined position with the ultraviolet beam of the laser 1. Still further, the control unit 30 is capable of controlling the relative position between the phase mask 3 and the optical fiber 10 by subjecting the translation stages 4-1 and 4-2 to movement controls. Also, it is capable of performing the control of fixing the optical fiber 10. The movement of the phase mask to the predetermined position, the adjustment of the phase shift amount, the adjustment of the laser irradiation, etc. are controlled by such an architecture.

Next, the applications of the present invention will be exemplified below. The present invention is applicable to, for example, a multi-wavelength filter and multiplexing/demultiplexing in optical multiplex communications, and the gain equalization, dispersion compensation filter and gain equalizer of an ADM (add/drop multiplexer) optical amplifier for WDM communications. Besides, as a light source for optical communications, the present invention is applicable to the wavelength selection, wavelength stabilization and wavelength collection/dispersion warrant of a filter for a multi-wavelength light source or a laser such as semiconductor laser or fiber laser. Further, a large number of applications such as the measurements of a distortion, etc. are considered as a fiber sensor for the present invention.

INDUSTRIAL APPLICABILITY

According to the present invention, a production method and a production device for a super structure fiber Bragg grating as are not limited by a phase mask length can be provided as described above.

What is claimed is:

1. A method of producing an optical-fiber grating, comprising the steps of:
    fixing a relative position between an optical fiber and a phase mask formed with gratings, to a first position;
    forming an interference light of predetermined grating width through the phase mask by an ultraviolet beam from a laser, at the first position, and irradiating the optical fiber with the interference light in one portion or in a plurality of portions at a predetermined grating spacing, thereby to form one or more first optical-fiber gratings;
    moving the phase mask and/or the optical fiber in a lengthwise direction of the optical fiber, and fixing the relative position between the phase mask and the optical fiber, to a second position;
    forming an interference light of predetermined grating width through the phase mask by the ultraviolet beam from the laser, at the second position, and irradiating the optical fiber with the interference light in one portion or in a plurality of portions at the predetermined grating spacing, thereby to form one or more second optical-fiber gratings; and
    irradiating the optical fiber with the ultraviolet beam from the laser without intervention of a phase mask, in an interspace between the first optical-fiber grating and the second optical-fiber grating in order to adjust a phase shift, thereby to form a phase shifting region, wherein, in a case where a total length or a channel spacing of a super structure optical-fiber grating is to be made $1/m$ (m=2, 3 ...), a phase shift $\phi_k$ of the following equation is given between the kth and (k+1)th optical-fiber gratings:

$$\phi_k = 2\pi(k-1)/m$$

(where $0 \leq k \leq N_{FBG}$ holds, $N_{FBG}$ indicates the number of the optical-fiber gratings, and $\phi_k$ is turned back at $2\pi$).

2. A method of producing an optical-fiber grating as defined in claim 1, wherein the first and second optical-fiber gratings are optical-fiber Bragg gratings, and envelope widths of reflection characteristics of the optical-fiber Bragg gratings are set by a total length of a super structure optical-fiber Bragg grating, while a channel spacing of the super structure optical-fiber Bragg grating are set by a spacing of the optical-fiber Bragg gratings.

3. A method of producing an optical-fiber grating as defined in claim 1, wherein:
    the optical fiber is a heavily germanium-doped and/or hydrogenated optical fiber.

4. A method of producing an optical-fiber grating as defined in claim 1, wherein the phase mask which has the gratings of changing grating period is used.

5. A production device for an optical-fiber grating, comprising:
    a laser which projects an ultraviolet beam;
    a slit which adjusts a width of the ultraviolet beam from the laser;
    a phase mask which is formed with gratings;
    a translation section which fixes a relative position between an optical fiber and the phase mask, to each of a first position and a second position; and
    an irradiation adjustment section which forms interference light of predetermined grating width through the slit and the phase mask by the ultraviolet beam from the laser, and to irradiate the optical fiber with the interference light in one portion or in a plurality of portions at a predetermined grating spacing,
    a control unit which controls the translation section, the laser and the irradiation adjustment section;
    the control unit including:
    means for controlling the translation section, thereby to fix the relative position between the phase mask and the optical fiber to the first position;
    means for controlling the laser, the slit and the irradiation adjustment section, thereby to form the interference light of the predetermined grating width through the phase mask by the ultraviolet beam from the laser, at the first position, and to irradiate the optical fiber with the interference light in one portion or in the plurality of portions at a predetermined grating spacing, whereby one or more first optical-fiber gratings are formed;
    means for controlling the translation section, thereby to move the phase mask and/or the optical fiber in a lengthwise direction of the optical fiber, and to fix the relative position between the phase mask and the optical fiber to the second position;
    means for controlling the laser, the slit and the irradiation adjustment section, thereby to form the interference light of the predetermined grating width through the phase mask by the ultraviolet beam from the laser, at the second position, and to irradiate the optical fiber with the interference light in one portion or in the plurality of portions at the predetermined grating spacing, whereby one or more second optical-fiber gratings are formed; and
    means for controlling the laser, the slit, the irradiation adjustment section and the translation section, thereby to irradiate the optical fiber with the ultraviolet beam from the laser without intervention of a phase mask in an interspace between the first optical-fiber grating and the second optical-fiber grating, in order to adjust a phase shift, whereby a phase shifting region is formed, wherein, in a case where a total length or a channel spacing of a super structure optical-fiber grating is to be made $1/m$ (m=2, 3 ...), a phase shift $\phi_k$ of the following equation is given between the kth and (k+1)th optical-fiber gratings:

$$\phi_k = 2\pi(k-1)/m$$

(where $0 \leq k \leq N_{FBG}$ holds, $N_{FBG}$ indicates the number of the optical-fiber gratings, and $\phi_k$ is turned back at $2\pi$).

6. A production device for an optical-fiber grating as defined in claim 5, further comprising:
    an analyzer which measures an optical spectrum of the optical fiber;
    wherein the control unit controls an irradiation output based on the laser, on the basis of a measured output from the analyzer, so that a desired phase shift amount may be attained.

7. A production device for an optical-fiber grating as defined in claim 5, wherein the translation section includes a first translation stage for fixing the optical fiber thereto and moving a position of the optical fiber, and a second translation stage for fixing the phase mask thereto and moving a position of the phase mask.

8. A production device for an optical-fiber grating as defined in claim 5, wherein the phase mask has the gratings of changing grating period.

9. A super structure optical-fiber grating, comprising:
    plural optical-fiber grating sections formed by forming interference light of predetermined grating width through the phase mask by an ultraviolet beam from a laser, and irradiating the optical fiber with the interference light in a plurality of portions at a predetermined grating spacing, and
    one or plural phase shifting regions formed by irradiating the optical fiber with the ultraviolet beam from the laser without intervention of a phase mask, in an interspace between the plural optical-fiber grating sections in order to adjust a phase shift, wherein, in a case where a total length or a channel spacing of a super structure optical-fiber grating is to be made 1/m (m=2, 3 . . . ), a phase shift $\phi_k$ of the following equation is given between the kth and (k+1)th optical-fiber grating sections:

$$\phi_k = 2\pi(k-1)/m$$

(where $0 \leq k \leq N_{FBG}$ holds, $N_{FBG}$ indicates the number of the optical-fiber grating sections, and $\phi_k$ is turned back at $2\pi$).

* * * * *